US012387686B2

(12) United States Patent
Kim et al.

(10) Patent No.: US 12,387,686 B2
(45) Date of Patent: Aug. 12, 2025

(54) DISPLAY DEVICE AND METHOD OF DRIVING THE SAME

(71) Applicant: Samsung Display Co., LTD., Yongin-si (KR)

(72) Inventors: Sooyeon Kim, Namyangju-si (KR); Taegon Im, Seongnam-si (KR)

(73) Assignee: SAMSUNG DISPLAY CO., LTD., Yongin-si (KR)

(*) Notice: Subject to any disclaimer, the term of this patent is extended or adjusted under 35 U.S.C. 154(b) by 5 days.

(21) Appl. No.: 18/108,734

(22) Filed: Feb. 13, 2023

(65) Prior Publication Data

US 2024/0013729 A1 Jan. 11, 2024

(30) Foreign Application Priority Data

Jul. 8, 2022 (KR) ........................ 10-2022-0084521

(51) Int. Cl.
*G09G 3/3266* (2016.01)
*G09G 3/20* (2006.01)
*G09G 3/3233* (2016.01)

(52) U.S. Cl.
CPC ......... *G09G 3/3266* (2013.01); *G09G 3/2096* (2013.01); *G09G 3/3233* (2013.01); *G09G 2300/0842* (2013.01); *G09G 2310/0286* (2013.01); *G09G 2310/08* (2013.01)

(58) Field of Classification Search
CPC ......... G09G 3/3233; G09G 2310/0286; G09G 2310/08
See application file for complete search history.

(56) References Cited

U.S. PATENT DOCUMENTS 9,685,119 B2 6/2017 Kim et al.
10,032,414 B2 * 7/2018 Kim ..................... G09G 3/3291
10,275,089 B2 * 4/2019 Kim ..................... G06F 3/0443
2015/0116247 A1 * 4/2015 Inoue .................. G06F 3/04166 345/173
2015/0170578 A1 * 6/2015 Choi .................... G09G 3/3266 345/212
2017/0102805 A1 * 4/2017 Xiao ..................... G06F 3/0412
2017/0162122 A1 * 6/2017 In ......................... G09G 3/3291
2017/0206840 A1 * 7/2017 Cho ...................... G09G 3/3266
2018/0130423 A1 * 5/2018 Kim ..................... H10K 59/124
2018/0137825 A1 * 5/2018 An ........................ G09G 3/3233
2018/0151124 A1 * 5/2018 An ........................ G09G 3/3266
2020/0066211 A1 * 2/2020 Lee ...................... G09G 3/3225
2020/0193912 A1 * 6/2020 Park ..................... G09G 3/3275
2021/0104197 A1 * 4/2021 Choi ..................... G11C 19/184
2021/0201767 A1 * 7/2021 Park ..................... G09G 3/3233
2023/0178003 A1 * 6/2023 Kim ..................... G09G 3/3233

* cited by examiner

*Primary Examiner* — William Boddie
*Assistant Examiner* — Bipin Gyawali
(74) *Attorney, Agent, or Firm* — KILE PARK REED & HOUTTEMAN PLLC

(57) ABSTRACT

A display device includes a display panel including a plurality of pixel rows, a driving controller that generates a clock signal and a gate driver that provides scan signals and sensing signals to the plurality of pixel rows in response to the clock signal, wherein the clock signal includes a plurality of first pulses in an active period of a frame period and a plurality of second pulses in a vertical blank period of the frame period, and a width of at least one of the plurality of second pulses is different from a width of each of the plurality of first pulses.

20 Claims, 7 Drawing Sheets

DISPLAY DEVICE AND METHOD OF DRIVING THE SAME

CROSS REFERENCE TO RELATED APPLICATION(S)

This application claims priority to and benefits of Korean Patent Application No. 10-2022-0084521 under 35 U.S.C. § 119, filed on Jul. 8, 2022, in the Korean Intellectual Property Office (KIPO), the entire contents of which are incorporated herein by reference.

BACKGROUND

1. Technical Field

The disclosure relates to a display device and method of driving the same. The disclosure relates to a display device for sensing characteristics of a driving transistor of a pixel and method for driving the same.

2. Description of the Related Art

In general, a display device is a device that displays an image using a light emitting diode. In the display device, pixels may have differences in characteristics such as a threshold voltage and a mobility of a driving transistor due to process variations, etc., and luminance deviation between the pixels and afterimages may occur according to deterioration of the light emitting diode.

To reduce the luminance deviation, the display device applies a sensing data voltage to pixels, applies scan signals and sensing signals to the pixels through a gate driver, and measures a current through each of the pixels according to the sensing data voltage. Thus, a sensing operation is performed to detect deterioration of the pixels based on the measured current.

However, since a vertical blank period is short for sensing to be performed only in the vertical blank period, a conventional gate driver additionally requires a sensing shift register capable of starting operation in advance in an active period. Thus, the conventional display device has limitations in terms of an area and a power consumption.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments of the disclosure may provide a display device and a method of driving the display device in which one shift register performs a writing mode and a sensing mode using modulation of a clock signal cycle and an output enable signal.

In an embodiment of a display device according to the disclosure, the display device may include a display panel including a plurality of pixel rows, a driving controller that generates a clock signal and a gate driver that provides scan signals and sensing signals to the plurality of pixel rows in response to the clock signal, wherein the clock signal may include a plurality of first pulses in an active period of a frame period and a plurality of second pulses in a vertical blank period of the frame period, and a width of at least one of the plurality of second pulses is different from a width of each of the plurality of first pulses.

In an embodiment, a number of the plurality of second pulses in the vertical blank period may be equal to a number of the plurality of first pulses in the active period.

In an embodiment, a number of the plurality of second pulses in the vertical blank period may be equal to a number of the plurality of pixel rows.

In an embodiment, the plurality of second pulses may include a third pulse corresponding to a sensing target pixel row among the plurality of pixel rows, and fourth pulses corresponding to the plurality of pixel rows except for the sensing target pixel row, and a width of the third pulse may be different from a width of each of the fourth pulses.

In an embodiment, the width of the third pulse may be equal to the width of the plurality of first pulses.

In an embodiment, the gate driver may include one shift register, and the one shift register may sequentially apply the scan signals and the sensing signals to the plurality of pixel rows in the active period and the one shift register may apply a corresponding one of the scan signals and a corresponding one of the sensing signals to a sensing target pixel row among the plurality of pixel rows in the vertical blank period.

In an embodiment, the one shift register may include a plurality of stages that sequentially outputs output signals in response to the clock signal, and the gate driver may include, a plurality of first output switches that selectively outputs the output signals as the scan signals in response to a first output enable signal and a plurality of second output switches that selectively outputs the output signals as the sensing signals in response to a second output enable signal.

In an embodiment, each of the first and second output enable signals and the plurality of first pulses of the clock signal in the active period include same pulses and each of the first and second output enable signals may include at least one pulse corresponding to the sensing target pixel row in the vertical blank period.

In an embodiment, the gate driver may not apply the scan signals and the sensing signals to the plurality of pixel rows except for a sensing target pixel row in the vertical blank period.

In an embodiment, the driving controller may randomly determine a sensing target pixel row on which a sensing operation is performed in the vertical blank period among the plurality of pixel rows.

In an embodiment, a pixel included in the plurality of pixel rows may include, a first transistor including a gate terminal electrically connected to a first node, a first terminal electrically connected to a second node, and a second terminal that receives a first power voltage, a second transistor including a gate terminal that receives a corresponding one of the scan signals, a first terminal electrically connected to a data line, and a second terminal electrically connected to the first node, a third transistor including a gate terminal that receives a corresponding one of the sensing signals, a first terminal electrically connected to a sensing line, and a second terminal electrically connected to the second node, a storage capacitor including a first terminal electrically connected to the first node and a second terminal electrically connected to the second node and a light emitting diode including a first terminal electrically connected to the second node and a second terminal that receives a second power voltage lower than the first power voltage.

In an embodiment of the method of driving a display device according to the disclosure, the method may include generating a clock signal including a plurality of first pulses in an active period, sequentially providing scan signals and sensing signals to a plurality of pixel rows in response to the clock signal in the active period, generating the clock signal including a plurality of second pulses in a vertical blank period and providing a corresponding one of the scan signals and a corresponding one of the sensing signals to a sensing target pixel row among the plurality of pixel rows in response to the clock signal to perform a sensing operation on the sensing target pixel row in the vertical blank period, wherein a width of at least one of the plurality of second pulses may be different from a width of each of the plurality of first pulses.

In an embodiment, a number of the plurality of second pulses in the vertical blank period may be equal to a number of the plurality of first pulses in the active period.

In an embodiment, a number of the plurality of second pulses in the vertical blank period may be equal to a number of the plurality of pixel rows.

In an embodiment, the plurality of second pulses may include a third pulse corresponding to the sensing target pixel row and fourth pulses corresponding to the plurality of pixel rows except for the sensing target pixel row, and wherein a width of the third pulse may be different from a width of each of the fourth pulses.

In an embodiment, the width of the third pulse may be equal to the width of the plurality of first pulses.

In an embodiment, the sequentially providing of the scan signals and the sensing signals to the plurality of pixel rows may include selectively outputting, by a driving controller, the scan signals in response to a first output enable signal and selectively outputting, by the driving controller, the sensing signals selectively in response to a second output enable signal.

In an embodiment, each of the first and second output enable signals and the plurality of first pulses of the clock signal in the active period may include same pulses, and each of the first and second output enable signals may include at least one pulse corresponding to the sensing target pixel row in the vertical blank period.

In an embodiment, the method may further include randomly determining the sensing target pixel row on which the sensing operation is performed in the vertical blank period among the plurality of pixel rows.

In an embodiment, a pixel included in the plurality of pixel rows may include, a first transistor including a gate terminal electrically connected to a first node, a first terminal electrically connected to a second node, and a second terminal that receives a first power voltage, a second transistor including a gate terminal that receives a corresponding one of the scan signals, a first terminal electrically connected to a data line, and a second terminal electrically connected to the first node, a third transistor including a gate terminal that receives a corresponding one of the sensing signals, a first terminal electrically connected to a sensing line, and a second terminal electrically connected to the second node, a storage capacitor including a first terminal electrically connected to the first node and a second terminal electrically connected to the second node and a light emitting diode including a first terminal electrically connected to the second node and a second terminal that receives a second power voltage lower than the first power voltage.

According to the display device and the method of driving the display device, a period of a clock signal corresponding to pixel rows except for the sensing target pixel row may be shortened in a vertical blank period so that a gate driver may perform the writing mode and the sensing mode with only one shift register.

However, the effects of the disclosure are not limited to the above-described effects, and may be variously expanded without departing from the spirit and scope of the disclosure.

It is to be understood that the embodiments above are described in a generic and explanatory sense only and not for the purpose of limitation, and the disclosure is not limited to the embodiments described above.

BRIEF DESCRIPTION OF THE DRAWINGS

The above and other features and advantages of the disclosure will become more apparent by describing in detailed embodiments thereof with reference to the accompanying drawings, in which.

DETAILED DESCRIPTION OF THE EMBODIMENTS

Figure 1:
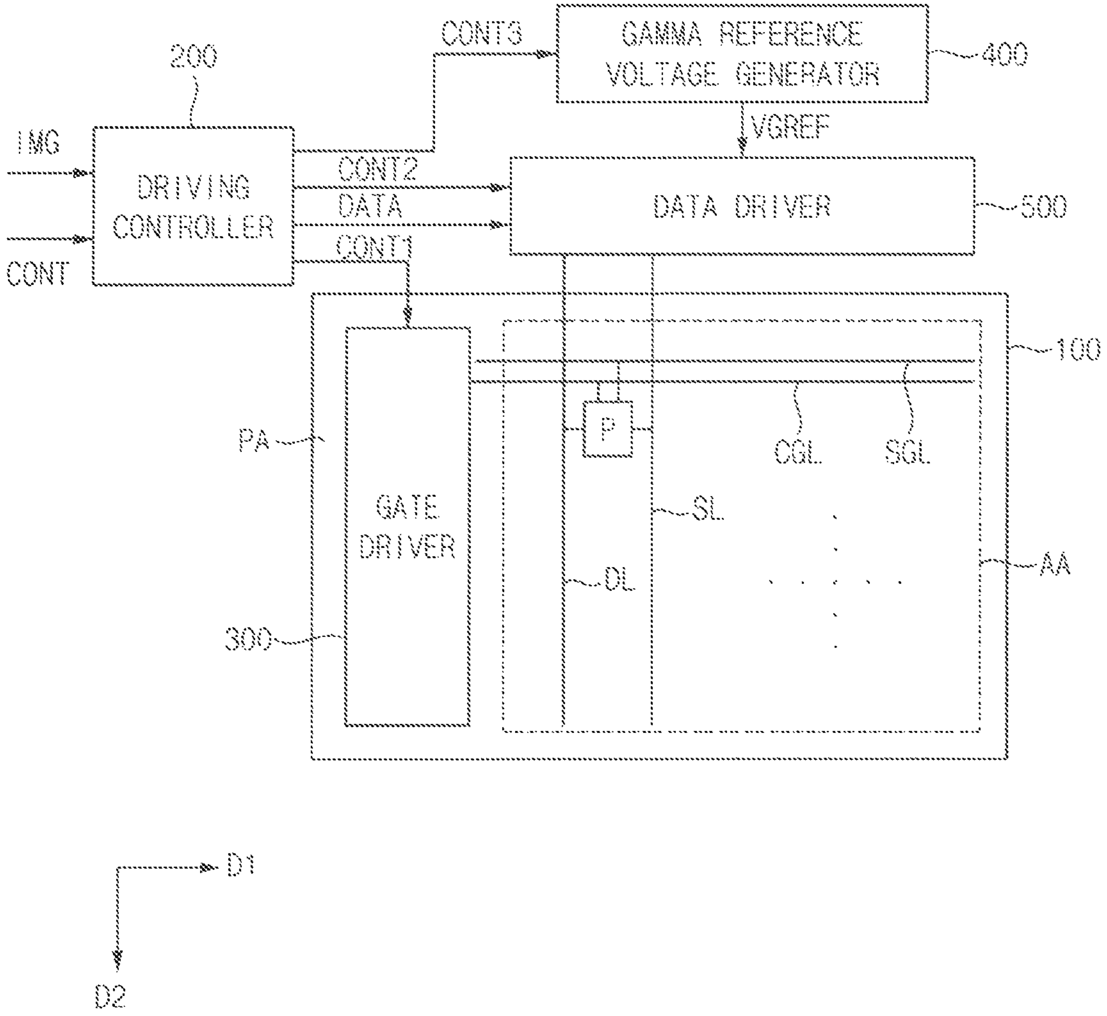
FIG. 1 is a block diagram illustrating a display device according to an embodiment of the disclosure.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, the sizes, thicknesses, ratios, and dimensions of the elements may be exaggerated for ease of description and for clarity. Like numbers refer to like elements throughout.

In the description, it will be understood that when an element (or region, layer, part, etc.) is referred to as being "on", "connected to", or "coupled to" another element, it can be directly on, connected to, or coupled to the other element, or one or more intervening elements may be present therebetween. In a similar sense, when an element (or region, layer, part, etc.) is described as "covering" another element, it can directly cover the other element, or one or more intervening elements may be present therebetween.

In the description, when an element is "directly on," "directly connected to," or "directly coupled to" another element, there are no intervening elements present. For example, "directly on" may mean that two layers or two elements are disposed without an additional element such as an adhesion element therebetween.

It will be understood that the terms "connected to" or "coupled to" may refer to a physical, electrical and/or fluid connection or coupling, with or without intervening elements.

As used herein, the expressions used in the singular such as "a," "an," and "the," are intended to include the plural forms as well, unless the context clearly indicates otherwise.

As used herein, the term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or".

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

It will be understood that, although the terms first, second, etc. may be used herein to describe various elements, these elements should not be limited by these terms. These terms are only used to distinguish one element from another element. Thus, a first element could be termed a second element without departing from the teachings of the disclosure. Similarly, a second element could be termed a first element, without departing from the scope of the disclosure.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "about" or "approximately" as used herein is inclusive of the stated value and means within an acceptable range of deviation for the recited value as determined by one of ordinary skill in the art, considering the measurement in question and the error associated with measurement of the recited quantity (i.e., the limitations of the measurement system). For example, "about" may mean within one or more standard deviations, or within ±20%, ±10%, or ±5% of the stated value.

It should be understood that the terms "comprises," "comprising," "includes," "including," "have," "having," "contains," "containing," and the like are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

FIG. 1 is a block diagram illustrating a display device according to an embodiment of the disclosure.

Referring to FIG. 1, a display device includes a display panel 100 and a display panel driver. The display panel driver includes a driving controller 200, a gate driver 300, a gamma reference voltage generator 400, and a data driver 500.

For example, the driving controller 200 and the data driver 500 may be integrally formed. For example, the driving controller 200, the gamma reference voltage generator 400, and the data driver 500 may be integrally formed. A driving module including at least the driving controller 200 and the data driver 500 which are integrally formed may be called to a timing controller embedded data driver (TED).

The display panel 100 may include a display region AA on which an image is displayed and a peripheral region PA adjacent to the display region AA.

For example, in the embodiment, the display panel 100 may be an organic light emitting diode display panel including an organic light emitting diode. For example, the display panel 100 may be a quantum-dot organic light-emitting diode display panel including an organic light-emitting diode and a quantum-dot color filter. For example, the display panel 100 may be a quantum-dot nano light emitting diode display panel including a nano light emitting diode and a quantum-dot color filter. For example, the display panel 100 may be a micro LED display panel such as an inorganic light emitting diode. For example, the display panel 100 may be a liquid crystal display panel including a liquid crystal layer.

The display panel 100 may include data lines DL, scan gate lines CGL, sensing gate lines SGL and the data lines DL, pixels P electrically connected to the scan gate lines CGL, and sensing gate lines SGL, and pixels P electrically connected to each of the sensing gate lines SGLs. The scan gate lines CGL and the sensing gate lines SGL extend in a first direction D1, and the data lines DL extend in a second direction D2 crossing the first direction D1.

In the embodiment, the display panel 100 may further include sensing lines SL connected to pixels P. The sensing lines SL may extend in the second direction D2.

In the embodiment, the display panel driver may include a sensing driver measuring a sensing voltage from the pixels P of the display panel 100 through the sensing lines SL. The sensing driver may be disposed in the data driver 500. In case that the data driver 500 has a form of a data driver IC, the sensing driver may be disposed in the data driver IC. In other embodiments, the sensing driver may be formed independently of the data driver 500. The disclosure is not limited to a specific position of the sensing driver.

The driving controller 200 may receive an input image data IMG and an input control signal CONT from an external device (not illustrated). For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3 and a data signal DATA based on the input image data IMG and the input control signal CONT.

The driving controller 200 may generate the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 may generate the data signal DATA based on the input image data IMG. The driving controller 200 outputs the data signal DATA to the data driver 500.

The driving controller 200 may generate a third control signal CONT3 for controlling an operation of the gamma reference voltage generator 400 based on the input control signal CONT and outputs it to the gamma reference voltage generator 400.

The gate driver 300 may generate scan signals SC and sensing signals SS in response to the first control signal CONT1 received from the driving controller 200. The gate driver 300 outputs the scan signals SC to the scan gate lines CGL and outputs the sensing signals SS to the sensing gate lines SGL. For example, the gate driver 300 may sequentially output the scan signals SC and the sensing signals SS to the scan gate lines CGL and the sensing gate lines SGL.

In an embodiment, the gate driver 300 may output the scan signals SC and the sensing signals SS to at least one sensing target pixel row in a sensing mode.

In an embodiment, the gate driver 300 may be integrated on the peripheral area PA of the display panel 100.

The gamma reference voltage generator 400 may generate a gamma reference voltage VGREF in response to the third control signal CONT3 received from the driving controller 200. The gamma reference voltage generator 400 provides the gamma reference voltage VGREF to the data driver 500. The gamma reference voltage VGREF may have a value corresponding to the data signal DATA.

In an embodiment, the gamma reference voltage generator 400 may be disposed in the driving controller 200 or in the data driver 500.

The data driver 500 may receive the second control signal CONT2 and the data signal DATA from the driving controller 200, and may receive the gamma reference voltage VGREF from the gamma reference voltage generator 400. The data driver 500 converts the data signal DATA into an analog data voltage VDATA using the gamma reference voltage VGREF. The data driver 500 outputs the data voltage VDATA to the data line DL.

Figure 2:
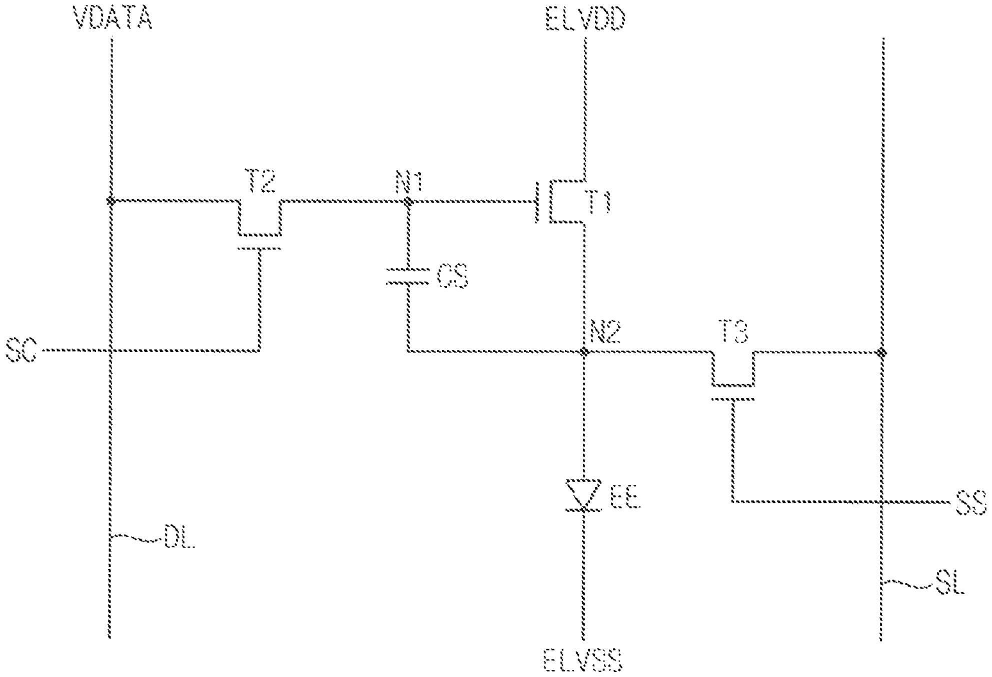
FIG. 2 is a schematic diagram of an equivalent circuit illustrating an example of a pixel of the display device of FIG. 1.

FIG. 2 is a schematic diagram of an equivalent circuit illustrating an example of the pixel P of the display device of FIG. 1.

Referring to FIG. 1 and FIG. 2, the pixel P may include a first transistor T1 including a gate terminal connected to a first node N1, a first terminal connected to a second node N2, and a second terminal configured to receive a first power voltage ELVDD, a second transistor T2 including a gate terminal configured to receive the scan signal SC, a first terminal connected to the data line DL, and a second terminal connected to the first node N1, a third transistor T3 including a gate terminal configured to receive the sensing signal SS, a first terminal connected to the sensing line SL, and a second terminal connected to the second node N2, a storage capacitor CS including a first terminal connected to the first node N1 and a second terminal connected to the second node N2 and a light emitting diode EE including a first terminal connected to a second node N2 and a second terminal configured to receive the second power voltage ELVSS.

The second power voltage ELVSS may be lower than the first power voltage ELVDD. For example, the light emitting diode EE may be an inorganic light emitting diode. For example, the light emitting diode EE may be an organic light emitting diode.

Figure 3:
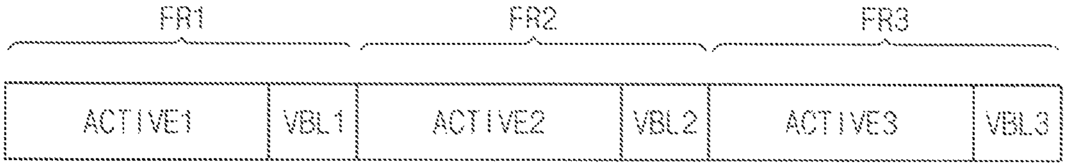
FIG. 3 is a diagram illustrating a driving timing of the display device of FIG. 1.

FIG. 3 is a diagram illustrating a driving timing of the display device of FIG. 1.

Referring to FIGS. 1 to 3, the display device may be driven in units of frames. The frames FR1, FR2, and FR3 may include active periods ACTIVE1, ACTIVE2, and ACTIVE3 and vertical blank periods VBL1, VBL2, and VBL3. In the active periods ACTIVE1, ACTIVE2, and ACTIVE3, the data voltage VDATA may be applied to the pixels P. In the vertical blank periods VBL1, VBL2, and VBL3, the data voltage VDATA may not be applied to the pixels P of the display panel 100.

For example, the sensing period may respectively be included in each of the vertical blank periods VBL1, VBL2, and VBL3. For example, the compensated data voltage VDATA in the second active period ACTIVE2 by measuring the sensing voltage through the sensing lines SL in the first vertical blank period VBL1 may be applied to the pixels P. For example, the compensated data voltage VDATA in the third active period ACTIVE3 by measuring the sensing voltage through the sensing lines SL in the second vertical blank period VBL2 may be applied to the pixels P.

Figure 4:
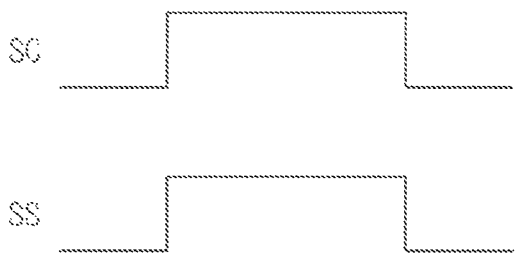
FIG. 4 is a timing diagram illustrating an example in which the display device of FIG. 1 including the pixel of FIG. 2 operates in an active period.
Figure 5:
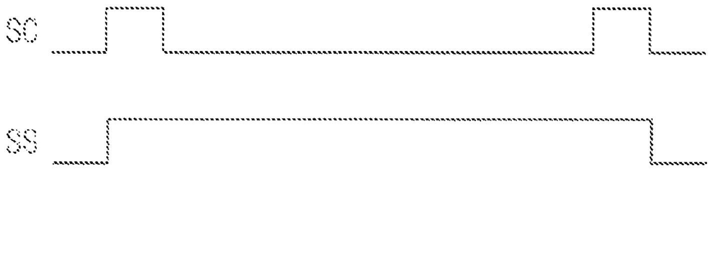
FIG. 5 is a timing diagram illustrating an example in which the display device of FIG. 1 including the pixel of FIG. 2 operates in a vertical blank period.

FIG. 4 is a timing diagram illustrating an example in which the display device of FIG. 1 including the pixel of FIG. 2 operates in the active period. FIG. 5 is a timing diagram illustrating an example in which the display device of FIG. 1 including the pixel of FIG. 2 operates in a vertical blank period.

Referring to FIGS. 1 to 5, the data driver 500 may operate in a writing mode and a sensing mode. The writing mode may be a mode in which the data voltage VDATA is applied to the pixels P, and the sensing mode may be a mode in which electrical characteristics of the pixels P are sensed.

The writing mode operates in the active period, and for example, in the writing mode, the scan signal SC and the sensing signal SS may be an activation level. In the writing mode, the second transistor T2 and the third transistor T3 are turned on, so that the data voltage VDATA may be applied to the first node N1 and a reference voltage may be applied to the second node N2. A voltage of a difference between the data voltage VDATA and the reference voltage may be applied to the storage capacitor CS.

The reference voltage may be a standard voltage applied to the second node N2 through the third transistor T3 to clarify a difference between a voltage of the first node N1 and a voltage of the second node N2.

The sensing mode may operate in a vertical blank period. For example, in the sensing mode, the scan signal SC and the sensing signal SS may be the activation level. The second transistor T2 and the third transistor T3 may be turned on, so that the sensing data voltage may be applied to the first node N1, and the voltage of the second node N2, for example, the sensing voltage may be applied to the sensing line SL. The scan signal SC may be a deactivation level and the sensing signal SS may be the activation level. A sensing circuit included in the data driver 500 or a separate sensing circuit may measure the voltage of the second node N2, for example, the sensing voltage through the sensing line SL (for example, sensing). The sensing circuit may sense an electrical characteristic of the first transistor T1 based on the sensing voltage. For example, the electrical characteristic of the first transistor T1 may be a mobility of the first transistor T1. For example, the electrical characteristic of the first transistor T1 may be a threshold voltage of the first transistor T1. For example, the sensing circuit may sense an electrical characteristic of the light emitting device EE based on the sensing voltage. For example, the electrical characteristic of the light emitting device EE may be a parasitic capacitance of the light emitting diode EE. The scan signal SC and the sensing signal SS may be the activation level. The second transistor T2 and the third transistor T3 are turned on, so that the data voltage VDATA may be applied to the first node N1 and the reference voltage may be applied to the second node N2. The voltage of the difference between the data voltage VDATA and the reference voltage may be applied to the storage capacitor CS. A sensing target pixel row on which a sensing operation is performed may operate in the same manner as multiple pixel rows except for the sensing target pixel row.

The driving controller 200 may compensate the data voltage VDATA applied to the pixels P according to the sensing voltage measured through the sensing line SL and output the compensated data voltage VDATA to the data driver 500. The data driver 500 may output the compensated data voltage based on the sensing voltage measured through the sensing line SL to the data line DL.

Figure 6:
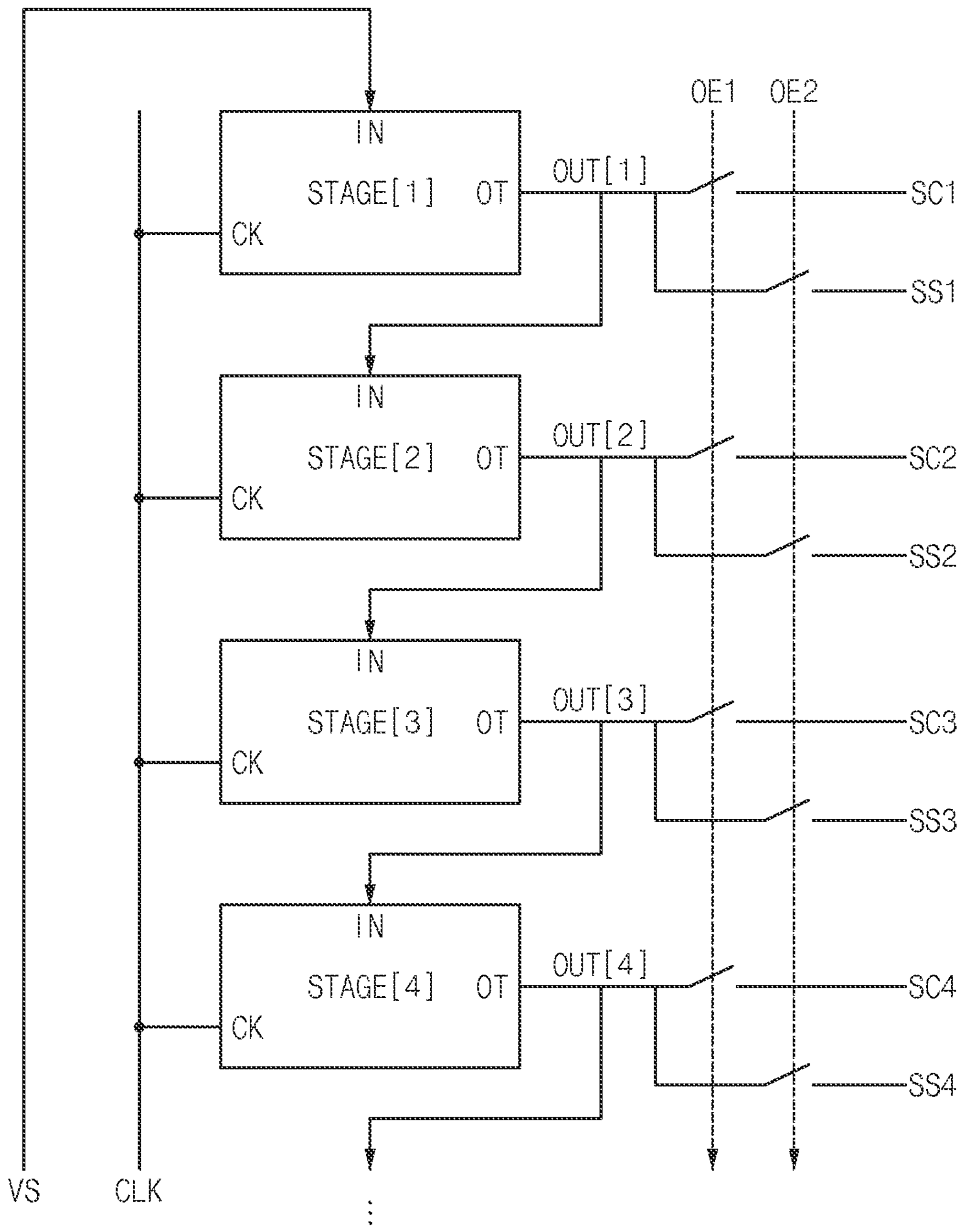
FIG. 6 is a block diagram illustrating an example of a gate driver of the display device of FIG. 1 including the pixel of FIG. 2.

FIG. 6 is a block diagram illustrating an example of the gate driver of the display device of FIG. 1 including the pixel of FIG. 2.

Referring to FIGS. 1 to 6, the gate driver 300 may include one shift register composed of stages (STAGE[1], STAGE[2], STAGE[3], STAGE[4], . . . ).

A first stage STAGE[1] may include an input terminal IN, a clock terminal CK, and an output terminal OT. A vertical start signal VS may be applied to the input terminal IN, a clock signal CLK may be applied to the clock terminal CK, the output terminal OT may output a first output signal OUT[1], and the first output signal OUT[1] may be used as a carry signal, a scan signal SC, and a sensing signal SS. The first output signal OUT[1] used as the carry signal may be applied to an input terminal IN of a second stage STAGE[2]. The scan signal SC may be selectively output in response to a first output enable signal OE1, and the sensing signal SS may be selectively output in response to a second output enable signal OE2. The gate driver 300 may include a first output switch turned on in response to the first output enable signal OE1 and a second output switch turned on in response to the second output enable signal OE2. The scan signal SC (SC1 . . . SC270) may be selectively output in response to the first output enable signal OE1, and the sensing signal SS (SS1 . . . SS270) may be selectively output in response to the second output enable signal OE2. Accordingly, in case that the output scan signal SC is the activation level, the second transistor T2 may be turned on, and in case that the output sensing signal SS is the activation level, the third transistor T3 may be turned on. In the writing mode, in case that the output scan signal SC is the activation level, the second transistor T2 is turned on so that the data voltage VDATA may be applied to the first node N1, and in case that the output sensing signal SS is the activation level, the third transistor T3 is turned on so that the reference voltage may be applied to the second node N2. In the sensing mode, in case that the output scan signal SC is the activation level, the second transistor T2 may be turned on so that the sensing data voltage can be applied to the first node N1, and in case that the output sensing signal SS is the activation level, the third transistor T3 may be turned on so that the voltage of the second node N2, for example, the sensing voltage may be applied to the sensing line SL.

Each of subsequent stages (STAGE[2], STAGE[3], STAGE[4], . . . ) may include the input terminal IN, the clock terminal CK, and the output terminal OT. Output signals (OUT[1], OUT[2], OUT[3], . . . ) used as the carry signals of a previous stage may be applied to the input terminal IN, and the clock signal CLK may be applied to the clock terminal CK. The output terminal OT may output the output signals (OUT[2], OUT[3], OUT[4], . . . ), and the output signals (OUT[2], OUT[3]], OUT[4], . . . ) may be used as the carry signal, the scan signal SC, and the sensing signal SS. The output signals (OUT[2], OUT[3], OUT[4], . . . ) used as the carry signals may be applied to the input terminal IN of a next stage. The scan signal SC may be selectively output in response to the first output enable signal OE1, and the sensing signal SS may be selectively output in response to the second output enable signal OE2. The gate driver 300 may include the first output switch turned on in response to the first output enable signal OE1 and the second output switch turned on in response to the second output enable signal OE2. The scan signal SC may be selectively output in response to the first output enable signal OE1, and the sensing signal SS may be selectively output in response to the second output enable signal OE2. Accordingly, in case that the output scan signal SC is the activation level, the second transistor T2 may be turned on, and in case that the output sensing signal SS is the activation level, the third transistor T3 may be turned on. In the writing mode, in case that the output scan signal SC is the activation level, the second transistor T2 is turned on so that the data voltage VDATA may be applied to the first node N1, and in case that the output sensing signal SS is the activation level, the third transistor T3 is turned on so that the reference voltage may be applied to the second node N2. In the sensing mode, in case that the output scan signal SC is the activation level, the second transistor T2 may be turned on so that the sensing data voltage may be applied to the first node N1, and in case that the output sensing signal SS is the activation level, the third transistor T3 may be turned on so that the voltage of the second node N2, for example, the sensing voltage may be applied to the sensing line SL.

For example, the first stage STAGE[1] may receive the vertical start signal VS, output the first output signal OUT[1] in response to the clock signal CLK, and the first output signal OUT[1] may be selectively output in response to the first output enable signal OE1 to be used as the scan signal SC of a first pixel row to turn on the second transistor T2. The output signal OUT[1] may be selectively output in response to the second output enable signal OE2 to be used as the sensing signal SS of the first pixel row to turn on the third transistor T3. The first output signal OUT[1] may be used as the carry signal to be applied to the second stage STAGE [2].

The second stage STAGE[2] may receive the first output signal OUT[1] used as the carry signal, output the second output signal OUT[2] in response to the clock signal CLK, and the second output signal OUT[2] may be selectively output in response to the first output enable signal OE1 to be used as the scan signal SC of the second pixel row to turn on the second transistor T2. The second output signal OUT[2] may be selectively output in response to the second output enable signal OE2 to turn on the third transistor T3 as the sensing signal SS of the second pixel row. The second output signal OUT[2] may be used as the carry signal to be applied to a third stage STAGE[3].

The third stage STAGE[3] may receive the second output signal OUT [2] used as the carry signal, output the third output signal OUT[3] in response to the clock signal CLK, and the third output signal OUT[3] may be selectively output in response to the first output enable signal OE1 to be used as the scan signal SC of the third pixel row to turn on the second transistor T2. The third output signal OUT[3] may be selectively output in response to the second output enable signal OE2 to turn on the third transistor T3 as the sensing signal SS of the third pixel row. The third output signal OUT[3] may be used as the carry signal to be applied to the fourth stage STAGE[4].

As such, the gate driver 300 may include one shift register, the one shift register may sequentially apply the scan signals SC and the sensing signals SS to the pixel rows in the active period, and in the vertical blank period, a corresponding one of the scan signals SC and a corresponding one of the sensing signals SS may be applied to the sensing target pixel row among the plurality of pixel rows. Accordingly, the gate driver 300 may not apply the scan signals SC and the sensing signals SS to the plurality of pixel rows except for the sensing target pixel row in the vertical blank period.

Figure 7:
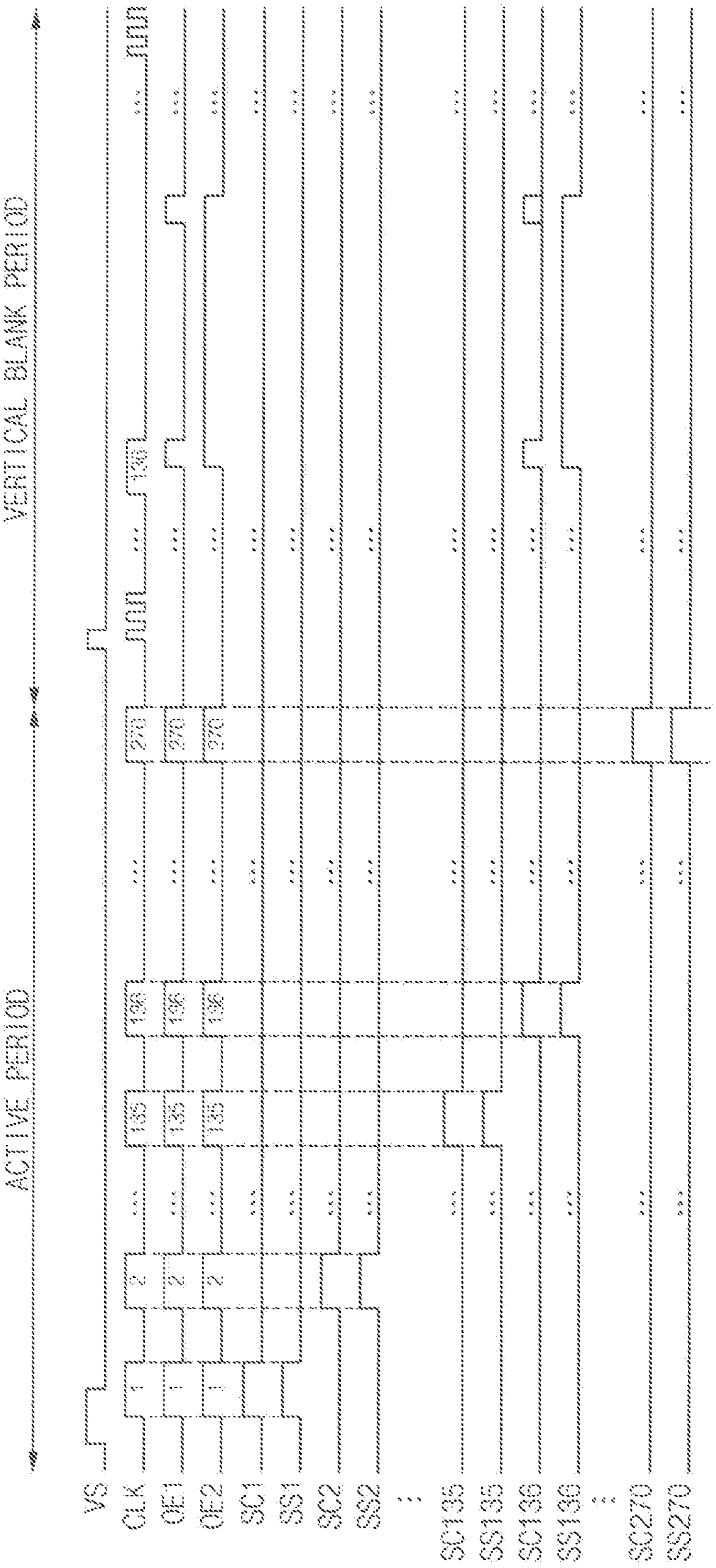
FIG. 7 is a timing diagram illustrating an example in which the display device of FIG. 1 including the pixel of FIG. 2 performs the writing mode and the sensing mode.

FIG. 7 is a timing diagram illustrating an example in which the display device of FIG. 1 including the pixel of FIG. 2 performs the writing mode and the sensing mode.

Referring to FIGS. 1 to 7, the display device is driven in units of frames, and the frame period may include the active period and the vertical blank period. The clock signal CLK may include a plurality of first pulses in the active period, a plurality of second pulses in the vertical blank period, and the second pulses may include a third pulse corresponding to the sensing target pixel row among the plurality of pixel rows and fourth pulses corresponding to the plurality of pixel rows except for the sensing target pixel row.

In the active period, the clock signal CLK may include multiple first pulses, and in case that the vertical start signal VS is activated, the first output enable signal OE1 and the second output enable signal OE2 may be periodically activated. An activation timing of the first output enable signal OE1 and an activation timing of the second output enable signal OE2 may be equal to an activation timing of the clock signal CLK. The scan signal SC may be activated in response to the first output enable signal OE1, and the sensing signal SS may be activated in response to the second output enable signal OE2. Activation timings of the scan signal SC and the sensing signal SS may be equal to the activation timings of the first output enable signal OE1 and the second output enable signal OE2. Accordingly, the activation timing of the scan signal SC and the sensing signal SS may be equal to the activation timing of the clock signal CLK. After the vertical start signal VS is activated, the scan signal SC and the sensing signal SS in an odd-numbered pixel row may be activated in response to the first output enable signal OE1 and the second output enable signal OE2 activated at odd-numbered times after the vertical start signal VS is activated, and after the vertical start signal VS is activated, the scan signal SC and the sensing signal SS in an even-numbered pixel row may be activated in response to the first and second output enable signals OE1, OE2 activated at even-numbered times after the vertical start signal VS is activated. The first and second output enable signals OE1, OE2 may include the same pulses as the plurality of first pulses of the clock signal CLK in the active period.

The first stage STAGE[1] may receive the vertical start signal VS generated by the driving controller 200 and output the first output signal OUT[1] in response to the clock signal CLK. The first output signal OUT[1] may be selectively output in response to the first output enable signal OE1 to turn on the second transistor T2 to be used as the scan signal SC of the first pixel row. The first output signal OUT[1] may be selectively output in response to the second output enable signal OE2 to turn on the third transistor T3 to be used as the sensing signal SS of the first pixel row. The first output signal OUT[1] may be used as the carry signal to be applied to the second stage STAGE[2].

The second stage STAGE[2] may receive the first output signal OUT[1] used as the carry signal and output the second output signal OUT[2] in response to the clock signal CLK. The second output signal OUT[2] may be selectively output in response to the first output enable signal OE1 to be used as the scan signal SC of the second pixel row to turn on the second transistor T2. The second output signal OUT[2] may be selectively output in response to the second output enable signal OE2 to turn on the third transistor T3 to be used as the sensing signal SS of the second pixel row. The second output signal OUT[2] may be used as the carry signal to be applied to the third stage STAGE[3].

As such, after the vertical start signal VS is activated, the scan signal SC and the sensing signal SS in the odd-numbered pixel row may be activated in response to the first output enable signal OE1 and the second output enable signal OE2 activated at odd-numbered times after the vertical start signal VS is activated, and after the vertical start signal VS is activated, the scan signal SC and the sensing signal SS in the even-numbered pixel row may be activated in response to the first output enable signal OE1 and the second output enable signal OE2 activated at even-numbered times after the vertical start signal VS is activated.

In the vertical blank period, the clock signal CLK may include the multiple second pulses, and in case that the vertical start signal VS is activated, the driving controller 200 modulates a cycle of the clock signal CLK to generate the clock signal CLK. Accordingly, a width of at least one of the second pulses may be different from a width of each of the first pulses. The driving controller 200 may randomly determine the sensing target pixel row on which the sensing operation is performed in the vertical blank period among the plurality of pixel rows, and generate the first output enable signal OE1 and the second output enable signal OE2 corresponding to the sensing target pixel row. The scan signal SC and the sensing signal SS in the sensing target pixel row on which the sensing operation is performed may be output in response to the first output enable signal OE1 and the second output enable signal OE2. Accordingly, each of the first and second output enable signals OE1, OE2 may include at least one pulse corresponding to the sensing target pixel row. The activation timings of the scan signal SC and the sensing signal SS in the sensing target pixel row on which the sensing operation is performed may be equal to the activation timings of the first output enable signal OE1 and the second output enable signal OE2 in the sensing target pixel row on which the sensing operation is performed. A width of the third pulse corresponding to the sensing target pixel row may be equal to the width of each of the first pulses, and in order to have a sufficient time for the sensing mode, a width of the fourth pulses corresponding to each of the pixel rows except for the sensing target pixel row may be narrow. Accordingly, the width of the third pulse may be different from the width of each of the fourth pulses. The clock signal CLK may be generated corresponding to the number of pixel rows in the active period, the vertical blank period, so that the number of the first pulses in the active period may be equal to the number of the pixel rows, in the vertical blank period the number of the second pulses may be equal to the number of the pixel rows, and accordingly, the number of the first pulses may be equal to the number of the second pulses. Thus, one shift register may perform the writing mode and the sensing mode.

The first stage STAGE[1] may receive the vertical start signal VS generated by the driving controller 200, output the first output signal OUT[1] in response to the clock signal CLK. In case that the first pixel row is the sensing target pixel row, the first output signal OUT[1] may be selectively output in response to the first output enable signal OE1 to turn on the second transistor T2 to be used as the scan signal SC of the first pixel row, the first output signal OUT[1] may be selectively output in response to the second output enable signal OE2 to turn on the third transistor T3 to be used as the sensing signal SS of the first pixel row, and the first output signal OUT[1] may be used as the carry signal to be applied to the second stage STAGE[2]. In case that the first pixel row is not the sensing target pixel row, the first output enable signal OE1 and the second output enable signal OE2 may not be activated, the first output signal OUT[1] may not be used as the scan signal SC and the sensing signal SS of the first pixel row, and the first output signal OUT[1] may be used as the carry signal to be applied to the second stage STAGE[2].

The second stage STAGE[2] may receive the first output signal OUT[1] used as the carry signal and output the second output signal OUT[2] in response to the clock signal CLK. In case that the second pixel row is the sensing target pixel row, the second output signal OUT[2] may be selectively output in response to the first output enable signal OE1 to turn on the second transistor T2 to be used as the scan signal SC of the second pixel row, the first output signal OUT[1] may be selectively output in response to the second output enable signal OE2 to turn on the third transistor T3 to be used as the sensing signal SS of the second pixel row, and the second output signal OUT[2] may be used as the carry signal to be applied to the third stage STAGE[3]. In case that the second pixel row is not the sensing target pixel row, the first output enable signal OE1 and the second output enable signal OE2 may not be activated. The first output signal OUT[1] may not be used as the scan signal SC and the sensing signal SS in the second pixel row, and the second output signal OUT[2] may be used as the carry signal to be applied to the third stage STAGE[3].

Accordingly, the display device may shorten the cycle of the clock signal CLK corresponding to the pixel rows except for the sensing target pixel row in the vertical blank period, so that the gate driver 300 may perform the writing mode and the sensing mode with only one shift register.

Figure 8:
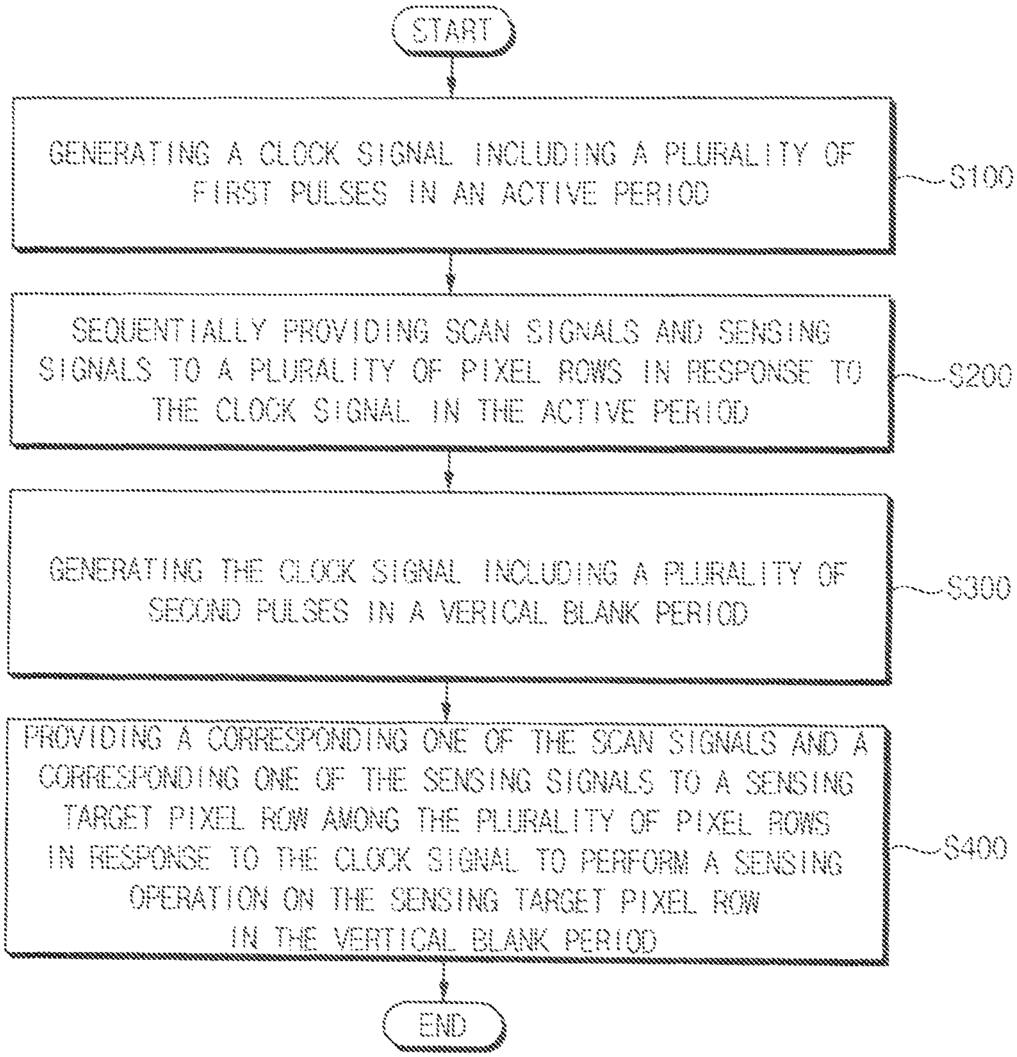
FIG. 8 is a flowchart illustrating a method of driving the display device.

FIG. 8 is a flowchart illustrating a method of driving the display device.

Referring to FIGS. 1 to 8, a method of driving the display device according to the disclosure may include generating the clock signal including multiple first pulses in the active period (S100), sequentially providing the scan signals SC and the sensing signals SS to the multiple pixel rows in response to the clock signal CLK in the active period (S200), generating the clock signal CLK including multiple second pulses in the vertical blank period (S300) and providing the corresponding one of the scan signals SC and the corresponding one of the sensing signals SS to the sensing target pixel row among the multiple pixel rows in response to the clock signal CLK to perform the sensing operation on the sensing target pixel row in the vertical blank period (S400). The width of at least one of the multiple second pulses may be different from the width of each of the multiple first pulses.

In an embodiment, sequentially providing the scan signals SC and the sensing signals SS to the multiple pixel rows (S200) may include selectively outputting, by the driving controller 200, the scan signals SC in response to the first output enable signal OE1 and selectively outputting, by the driving controller 200, the sensing signals SS selectively in response to the second output enable signal OE2.

In an embodiment, the method of driving the display device according to the disclosure further include randomly determining the sensing target pixel row on which the sensing operation may be performed in the vertical blank period among the plurality of pixel rows.

Accordingly, the display device may shorten the cycle of the clock signal CLK corresponding to the pixel rows except for the sensing target pixel row in the vertical blank period, so that the gate driver 300 may perform the writing mode and the sensing mode with only one shift register.

Figure 9:
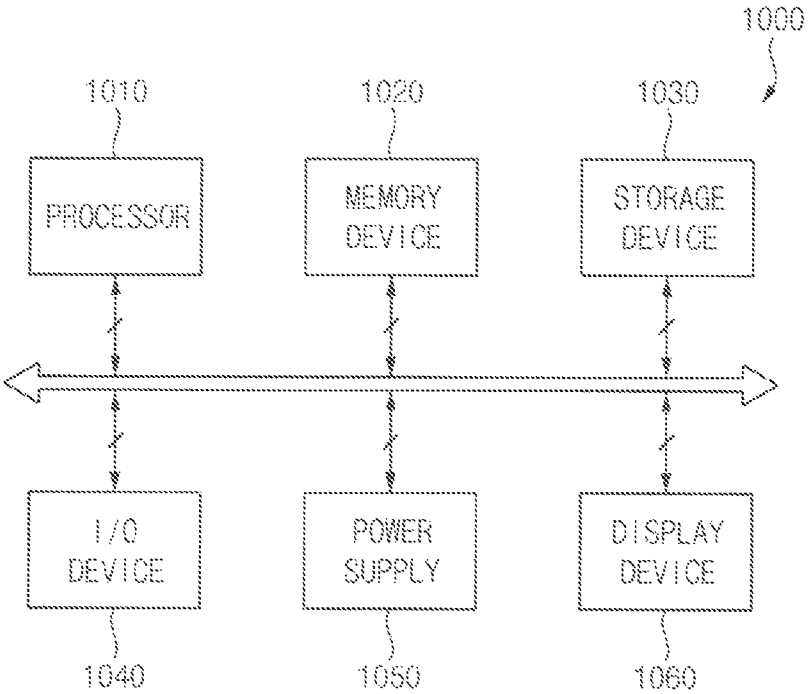
FIG. 9 is a block diagram illustrating an electronic device according to embodiments of the disclosure.
Figure 10:
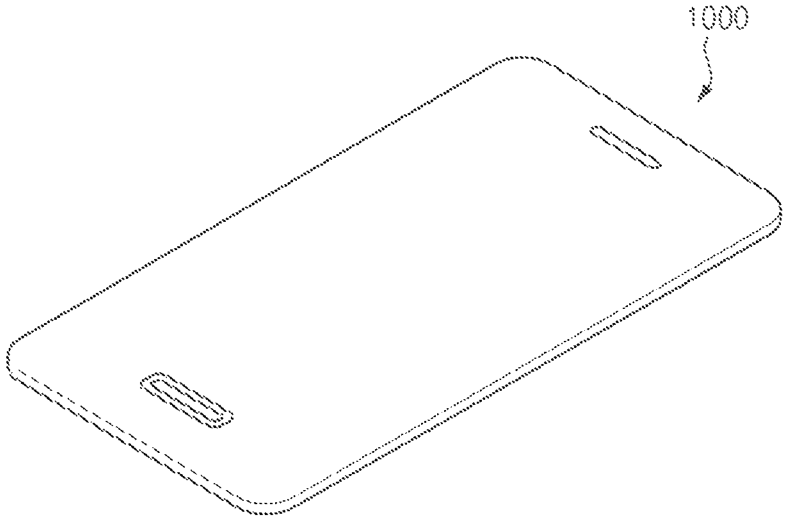
FIG. 10 is a diagram illustrating an example in which the electronic device of FIG. 9 is implemented as a smart phone.

FIG. 9 is a block diagram illustrating an electronic device 1000 according to embodiments of the disclosure. FIG. 10 is a diagram illustrating an example in which the electronic device 1000 of FIG. 9 is implemented as a smart phone.

Referring to FIGS. 9 and 10, the electronic device 1000 may include a processor 1010, a memory device 1020, a storage device 1030, an input/output (I/O) device 1040, a power supply 1050, and a display device 1060. The display device 1060 may be the display device 100 of FIG. 1. The electronic device 1000 may further include ports for communicating with a video card, a sound card, a memory card, a universal serial bus (USB) device, other electronic devices, and the like. In an embodiment, as illustrated in FIG. 10, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a microprocessor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus. The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like. The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060. The power supply 1050 may provide power for operations of the electronic device 1000.

Embodiments may be applied to any display device and any electronic device including the touch panel. For example, embodiments may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure.

What is claimed is:

1. A display device comprising:
- a display panel including a plurality of pixel rows;
- a driving controller that generates a clock signal; and
- a gate driver that provides scan signals and sensing signals to the plurality of pixel rows in response to the clock signal, wherein the clock signal includes:
- a plurality of first pulses in an active period of a frame period output on a first signal line; and
- a plurality of second pulses in a vertical blank period of the frame period output on the first signal line, and
- a width of at least one of the plurality of second pulses is different from a width of each of the plurality of first pulses, and
- a width of another of at least one of the plurality of second pulses which corresponds a sensing target pixel row is equal to the width of at least one of the plurality of first pulses, and
- a number of the plurality of second pulses in the vertical blank period is equal to a number of the plurality of first pulses in the active period.

2. The display device of claim 1, wherein the gate driver does not apply the scan signals and the sensing signals to the plurality of pixel rows except for the sensing target pixel row in the vertical blank period.

3. The display device of claim 1, wherein the driving controller randomly determines the sensing target pixel row on which a sensing operation is performed in the vertical blank period among the plurality of pixel rows.

4. The display device of claim 1, wherein a pixel included in the plurality of pixel rows includes:
- a first transistor including a gate terminal electrically connected to a first node, a first terminal electrically connected to a second node, and a second terminal that receives a first power voltage;
- a second transistor including a gate terminal that receives a corresponding one of the scan signals, a first terminal electrically connected to a data line, and a second terminal electrically connected to the first node;
- a third transistor including a gate terminal that receives a corresponding one of the sensing signals, a first terminal electrically connected to a sensing line, and a second terminal electrically connected to the second node;
- a storage capacitor including a first terminal electrically connected to the first node and a second terminal electrically connected to the second node; and
- a light emitting diode including a first terminal electrically connected to the second node and a second terminal that receives a second power voltage lower than the first power voltage.

5. The display device of claim 1, wherein the width of another of the at least one of the plurality of second pulses is different than the width of each of the plurality of first pulses.

6. The display device of claim 1, wherein a number of the plurality of second pulses in the vertical blank period is equal to a number of the plurality of pixel rows.

7. The display device of claim 6, wherein the plurality of second pulses include:
- a third pulse corresponding to the sensing target pixel row among the plurality of pixel rows; and
- fourth pulses corresponding to the plurality of pixel rows except for the sensing target pixel row, and
- a width of the third pulse is different from a width of each of the fourth pulses.

8. The display device of claim 7, wherein the width of the third pulse is equal to the width of each of the plurality of first pulses.

9. The display device of claim 1, wherein
- the gate driver includes one shift register,
- the one shift register sequentially applies the scan signals and the sensing signals to the plurality of pixel rows in the active period; and
- the one shift register applies a corresponding one of the scan signals and a corresponding one of the sensing signals to the sensing target pixel row among the plurality of pixel rows in the vertical blank period.

10. The display device of claim 9, wherein
- the one shift register includes a plurality of stages that sequentially outputs output signals in response to the clock signal, and
- the gate driver includes:
  - a plurality of first output switches that selectively output the output signals as the scan signals in response to a first output enable signal; and
  - a plurality of second output switches that selectively output the output signals as the sensing signals in response to a second output enable signal.

11. The display device of claim 10, wherein
- each of the first and second output enable signals and the plurality of first pulses of the clock signal in the active period include same pulses, and
- each of the first and second output enable signals includes at least one pulse corresponding to the sensing target pixel row in the vertical blank period.

12. A method of driving a display device, the method comprising:
- generating a clock signal including a plurality of first pulses output on a first signal line in an active period;

sequentially providing scan signals and sensing signals to a plurality of pixel rows in response to the clock signal in the active period;

generating the clock signal including a plurality of second pulses output on the first signal line in a vertical blank period; and providing a corresponding one of the scan signals and a corresponding one of the sensing signals to a sensing target pixel row among the plurality of pixel rows in response to the clock signal to perform a sensing operation on the sensing target pixel row in the vertical blank period, wherein a width of at least one of the plurality of second pulses is different from a width of each of the plurality of first pulses, and a width of another of at least one of the plurality of second pulses which corresponds the sensing target pixel row is equal to the width of at least one of the plurality of first pulses, and a number of the plurality of second pulses in the vertical blank period is equal to a number of the plurality of first pulses in the active period.

13. The method of claim 12, further comprising:

randomly determining the sensing target pixel row on which the sensing operation is performed in the vertical blank period among the plurality of pixel rows.

14. The method of claim 12, wherein a pixel included in the plurality of pixel rows includes:

a first transistor including a gate terminal electrically connected to a first node, a first terminal electrically connected to a second node, and a second terminal that receives a first power voltage;

a second transistor including a gate terminal that receives a corresponding one of the scan signals, a first terminal electrically connected to a data line, and a second terminal electrically connected to the first node;

a third transistor including a gate terminal that receives a corresponding one of the sensing signals, a first terminal electrically connected to a sensing line, and a second terminal electrically connected to the second node;

a storage capacitor including a first terminal electrically connected to the first node and a second terminal electrically connected to the second node; and a light emitting diode including a first terminal electrically connected to the second node and a second terminal that receives a second power voltage lower than the first power voltage.

15. The method of claim 12, wherein a number of the plurality of second pulses in the vertical blank period is equal to a number of the plurality of first pulses in the active period.

16. The method of claim 15, wherein the plurality of second pulses includes:

a third pulse corresponding to the sensing target pixel row; and fourth pulses corresponding to the plurality of pixel rows except for the sensing target pixel row, and a width of the third pulse is different from a width of each of the fourth pulses.

17. The method of claim 16, wherein the width of the third pulse is equal to the width of each of the plurality of first pulses.

18. The method of claim 12, wherein the sequentially providing of the scan signals and the sensing signals to the plurality of pixel rows includes:

selectively outputting, by a driving controller, the scan signals in response to a first output enable signal; and selectively outputting, by the driving controller, the sensing signals selectively in response to a second output enable signal.

19. The method of claim 18, wherein each of the first and second output enable signals and the plurality of first pulses of the clock signal in the active period include same pulses, and each of the first and second output enable signals includes at least one pulse corresponding to the sensing target pixel row in the vertical blank period.

20. An electronic device comprising:

a display panel including a plurality of pixel rows;

a driving controller that generates a clock signal; and a gate driver that provides scan signals and sensing signals to the plurality of pixel rows in response to the clock signal, wherein the clock signal includes:

a plurality of first pulses in an active period of a frame period output on a first signal line; and a plurality of second pulses in a vertical blank period of the frame period output on the first signal line, and a width of at least one of the plurality of second pulses is different from a width of each of the plurality of first pulses, and a width of another of at least one of the plurality of second pulses which corresponds a sensing target pixel row is equal to the width of at least one of the plurality of first pulses, and a number of the plurality of second pulses in the vertical blank period is equal to a number of the plurality of first pulses in the active period.

* * * * *